(12) United States Patent
Hawman et al.

(10) Patent No.: US 7,340,319 B2
(45) Date of Patent: Mar. 4, 2008

(54) METHOD AND SYSTEM FOR MAINTAINING AN AIRCRAFT ENGINE

(75) Inventors: Michael W. Hawman, Vernon, CT (US); Daniel J. Budnik, Southington, CT (US); Michael A. Roberts, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/064,105

(22) Filed: Jun. 11, 2002

(65) Prior Publication Data

US 2003/0040826 A1 Feb. 27, 2003

Related U.S. Application Data

(60) Provisional application No. 60/297,653, filed on Jun. 12, 2001.

(51) Int. Cl.
*G06F 19/00* (2006.01)
(52) U.S. Cl. .................. 700/116; 700/115; 702/184
(58) Field of Classification Search .............. 700/115, 700/116; 702/184; 705/28, 29
See application file for complete search history.

(56) References Cited

U.S. PATENT DOCUMENTS

| | | | |
|---|---|---|---|
| 5,283,943 A | 2/1994 | Aguayo et al. | 29/701 |
| 6,041,268 A | 3/2000 | Jin | |
| 6,064,982 A | 5/2000 | Puri | |
| 6,192,291 B1 | 2/2001 | Kwon | 700/121 |
| 6,223,094 B1 | 4/2001 | Muehleck et al. | |
| 6,253,187 B1 | 6/2001 | Fox | |
| 6,338,045 B1* | 1/2002 | Pappas | 705/29 |
| 6,418,361 B2 | 7/2002 | Sinex | |
| 6,516,239 B1* | 2/2003 | Madden et al. | 700/115 |
| 6,728,610 B1 | 4/2004 | Marshall et al. | |
| 2001/0032109 A1 | 10/2001 | Gonyea et al. | |
| 2001/0056310 A1* | 12/2001 | Aoki | 700/116 |
| 2002/0035495 A1 | 3/2002 | Spira et al. | |

FOREIGN PATENT DOCUMENTS

| | | |
|---|---|---|
| EP | 0 652 539 | 5/1995 |
| EP | 0 875 365 | 11/1998 |
| GB | 2 347 522 | 9/2000 |
| GB | 2 353 124 | 2/2001 |

* cited by examiner

*Primary Examiner*—Ryan A Jarrett
(74) *Attorney, Agent, or Firm*—Bachman & LaPointe, P.C.

(57) ABSTRACT

A computerized method of assisting the routing of a part, comprising the steps of: providing at least one computer; receiving part identifier information; and generating a tag for affixing to the part. The tag has information thereon responsive to the identifier information. A computerized method of assisting the handling of a part, comprising the steps of: providing at least one computer; receiving part identifier information; processing the part identifier information; and generating output from the computer responsive to the part identifier information. A computerized method of tailoring work instructions to perform on a part, comprising the steps of: providing at least one computer having memory with global work instructions relevant to a plurality of parts and to a plurality of work locations; receiving part identifier information and work location information; processing the part identifier and work location information; and generating tailored work instructions from said computer responsive to the part identifier and work location information. A computerized method of dispositioning of parts, comprising the steps of: providing at least one computer; receiving part identifier information for first and second part; determining a disposition of the first part then the second part, each disposition responsive to the part identifier information; determining whether the second part disposition requires adjustment to the first part disposition; and if necessary, modifying said first part disposition.

26 Claims, 12 Drawing Sheets

FIG. 2

INSPECTION

SALES ORDER # [987654] SECTION [7252-00]
PW404                    HPT CJD & FINAL ASSY
XYZ AIRLINES

PART # [50L745-01] QTY [1]

| TECH INFO | CONFIGURATION | DISPOSITION | STATUS |

● SERVICEABLE
○ REMOVE FROM SERVICE
○ INTERNAL REPAIR
○ CHANGE INTERNAL REPAIR
○ EXTERNAL REPAIR
○ HOLD

[DISPOSITION]

METHOD AND SYSTEM FOR MAINTAINING AN AIRCRAFT ENGINE

CROSS REFERENCE TO RELATED APPLICATIONS

This application claims priority to U.S. Provisional Patent Application No. 60/297,653 filed on 12 Jun. 2001 and is related to U.S. patent application Ser. No. 10/063,922 filed on 24 May 2002. Both applications are herein incorporated by reference.

BACKGROUND OF INVENTION

This invention relates to a method and system for managing maintenance operations on a product. More particularly, this invention relates to a computerized method and system for managing the maintenance, repair or overhaul of a gas turbine engine.

The following terms will be used throughout the specification:

"Bill of Material ("BOM") refers to a list of components that define a product, such as a gas turbine engine.

Master Parts List ("MPL") or Grand BOM refers to a list of all potential parts that could be used in the engine.

"As-Built BOM refers to a list of parts used by the Original Equipment Manufacturer (OEM) or a maintenance facility to assemble the engine.

"As-Shipped BOM" refers to a list of parts in the engine when the OEM or the maintenance facility releases the engine to the customer. Since the engine may undergo testing after assembly or repair, the As-Shipped BOM may not be the same as the As-Built BOM. If testing proves successful, the OEM or the maintenance facility releases the engine and the As-Shipped BOM will mirror the As-Built BOM. If testing proves unsuccessful, the OEM or the maintenance facility may replace parts on the engine and perform additional testing. Should the OEM or the maintenance facility replace parts, the As-Shipped BOM may not be the same as the As-Built BOM.

Expected BOM refers to a list of parts that a maintenance facility should find during disassembly of an engine during a maintenance operation.

"As-Received Configuration refers to a list of parts actually removed from the engine by the maintenance facility during disassembly. If the maintenance facility performed the previous maintenance operation, then the As-Received Configuration and Expected BOM will be the same.

Planned Configuration refers to a preliminary list of parts selected by the maintenance facility for reassembly into the engine. The maintenance facility determines the Planned Configuration by using the Expected BOM and the work scope to be performed on the engine.

Should Build Configuration refers to a list of parts selected by the maintenance facility for reassembly into the product. Typically, the maintenance facility determines the Should Build Configuration after completing disassembly of the engine.

Engine Manual ("EM") refers to a publication that contains OEM and aviation authority (e.g. Federal Aviation Administration, Joint Aviation Authority, etc.) approved engine maintenance procedures.

Illustrated Parts Catalog ("IPC") refers to a publication that provides part numbers and illustrations for parts used to manufacture an engine and for replacement parts.

Service Bulletin ("SB") refers to a publication containing OEM and aviation authority approved technical data for incorporating an engineering change into an existing engine. The Service Bulletin includes work instructions necessary to incorporate the engineering change into the engine.

"Add Parts List refers to the parts that the Service Bulletin can add to the engine.

Cancel Parts List refers to the parts that the Service Bulletin can remove from the engine.

"Sets Requirement" refers to a stipulation in a Service Bulletin that all of the parts on the Add Parts List must be added to the engine and that all of the parts on the Cancel Parts List must be removed from the engine. In other words, a Sets Requirement prohibits partial incorporation of a Service Bulletin. A Service Bulletin can have other types of sets requirements. For example, a Sets/Stage Requirement may arise when an SB deals with multiple locations within the engine (e.g. fifth and sixth stage compressor blade locations). The Sets/Stage Requirement allows partial incorporation of the SB by replacing all of the subject parts at one location within the engine (e.g. replace all of the compressor blades from the fifth stage, without replacing the sixth stage). The maintenance facility would fully incorporate the SB during a subsequent maintenance visit by replacing the sixth stage blades. An Optional Set Dependency indicates related parts within the Add Parts List. An assembly (such as a ring segment), which is formed by various subcomponents (such as vane assemblies and pins), typifies related parts within an SB. When an Optional Set Dependency exists, the program will display the options available for all of the related parts as a group.

A maintenance facility can perform a variety of maintenance operations on an engine. In increasing order of complexity, these maintenance operations include maintenance, repair and overhaul. During any maintenance operation, the maintenance facility must keep records in order to comply with the requirements of the relevant aviation authorities. Conventionally, the maintenance facility performed such record keeping manually.

While a maintenance facility may have conventionally relied on computers for assistance, each area of the maintenance facility (e.g. inspection, assembly, etc.) typically used a dedicated system customized to the unique needs of that area. In other words, these systems were not designed to coordinate with the computer systems in other areas of the maintenance facility. This prevented different areas within the same maintenance facility from sharing data. Likewise, the computer systems at the maintenance facility and at outside vendors were not connected so the entities could not share data.

The parts involved in such a maintenance operation may travel through multiple areas within the maintenance facility and through outside vendors. Each internal area or outside vendor performs a necessary function with respect to the part during the maintenance operation. Conventional techniques do not readily track the existence of a part within the maintenance facility nor the flow of such part through the maintenance facility or through outside vendors. In other words, one area of the maintenance facility may lack visibility of part and part flow through other areas of the maintenance facility or through an outside vendor.

The present invention manages these maintenance operations without the aforementioned drawbacks of conventional techniques.

SUMMARY OF INVENTION

It is, therefore, an object of the present invention to provide a new and improved method and apparatus for managing maintenance operations on a product.

It is a further object of the present invention to provide a maintenance method and apparatus that reduces the number of steps performed in a maintenance operation.

It is a further object of the present invention to provide a computerized method and system for managing the maintenance, repair or overhaul of a gas turbine engine.

It is a further object of the present invention to provide a computerized maintenance method and system that reduces the number of manual steps performed in a maintenance operation.

It is a further object of the present invention to provide a maintenance method and apparatus that reduces the number of systems dedicated to a specific area within the maintenance facility.

It is a further object of the present invention to provide a maintenance method and apparatus that increases the visibility of parts and part flow between areas of the maintenance facility.

These and other objects of the present invention are achieved in one aspect by a computerized method of assisting the routing of a part. The method comprises the steps of: providing at least one computer; receiving part identifier information; and generating a tag for affixing to said part, said tag having information thereon responsive to said part identifier information. A user reviews said information on said tag and routes said part accordingly.

These and other objects of the present invention are achieved in another aspect by a computerized method of assisting the handling of a part. The method comprises the steps of: providing at least one computer; receiving part identifier information; processing said part identifier information; and generating output from said computer responsive to said part identifier information. A user reviews said output and handles said part accordingly.

These and other objects of the present invention are achieved in another aspect by a computerized method of tailoring work instructions to perform on a part. The method includes the steps of: providing at least one computer having memory with global work instructions therein, said global work instructions relevant to a plurality of parts and to a plurality of work locations; receiving part identifier information and work location information; processing said part identifier information and said work location information; and generating tailored work instructions from said computer responsive to said part identifier information and said work location information. A user reviews said tailored work instructions and performs said tailored work instructions accordingly.

These and other objects of the present invention are achieved in another aspect by a computerized method of dispositioning of parts. The method comprises the steps of: providing at least one computer; receiving part identifier information for a first part; determining a disposition of said first part responsive to said first part identifier information; receiving part identifier information for a second part to said computer; determining a disposition of said second part responsive to said second part identifier; determining whether said second part disposition requires adjustment to said first part disposition; and if necessary, modifying said first part disposition. A user reviews said first and second part dispositions and dispositions said first and second parts accordingly.

BRIEF DESCRIPTION OF DRAWINGS

Other uses and advantages of the present invention will become apparent to those skilled in the art upon reference to the specification and the drawings, in which:

FIG. 2 is part of an Engine Inspection Record used during an overhaul;

FIGS. 6a-d are screens generated on the computer system of FIG. 3 by an inspection module of the present invention.

DETAILED DESCRIPTION

Although the present invention will now be described in the context of an at a maintenance facility, the present invention could be used during any other type of maintenance operation. In fact, the present invention may have applicability in fields that require part tracking.

Figure 1:
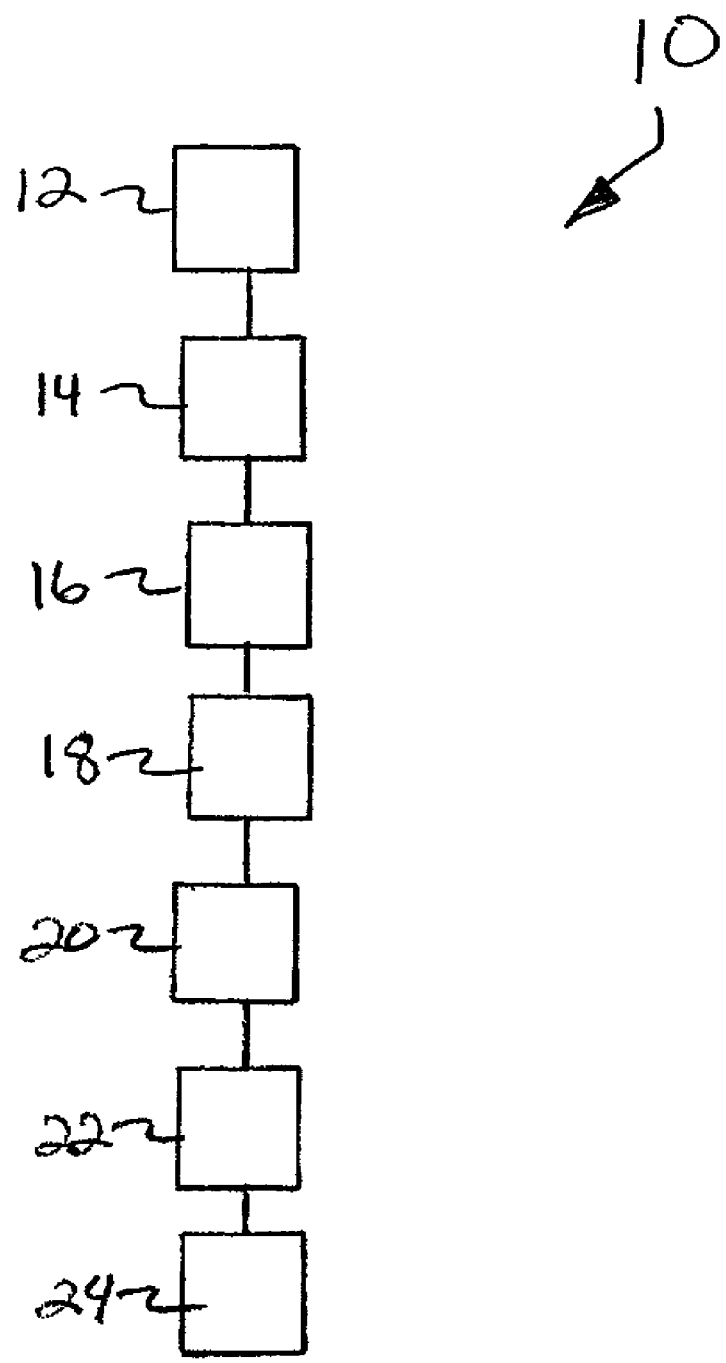
FIG. 1 is a flowchart of the steps involved in an overhaul of an engine.

FIG. 1 shows a flowchart of an overhaul process 10. As a first step 12, the maintenance facility defines the work scope to be performed on the engine. The work scope includes the necessary work instructions to perform an overhaul, along with the completion of any Service Bulletins requested by the engine owner. The engine owner and the maintenance facility typically generate the work scope.

At a second step 14, the maintenance facility receives the engine. In a third step 16, the maintenance facility tears the engine down to part level. At a fourth step 18, the maintenance facility inspects the parts. The inspection step determines, for example, whether each part can be returned to service (i.e. a serviceable part), requires rework, or must be removed from service.

A fifth step 20 sources the parts that will be used when assembling the engine. Based upon the results of the inspection in step 18, the maintenance facility preferably routes a part based upon whether the part is identified as: (1) serviceable; (2) requiring rework; or (3) remove from service. The fifth step 20 also obtains any additional parts required to assemble the engine (e.g. prepare a purchase order request).

A sixth step 22 assembles the engine with the parts obtained by the fifth step 20, then tests the engine to ensure satisfactory operation. Finally, a seventh step 24 ships the overhauled engine to the engine owner.

Conventionally, the technician at the maintenance facility consulted hard copies of the EM, IPC or other publications to perform the third step 16 and the fourth step 18. Once disassembled, the technician routed the parts to an inspector (perhaps with intermediate stops at other locations in the maintenance facility to, for example, clean or test the part).

The inspector receives the parts and determines the condition of the parts in the fourth step 18. During this process, the inspector must maintain adequate records. One example of such a record keeping system is the Engine Inspection Record (EIR) used by Pratt & Whitney of East Hartford, Connecticut.

Figure 2:
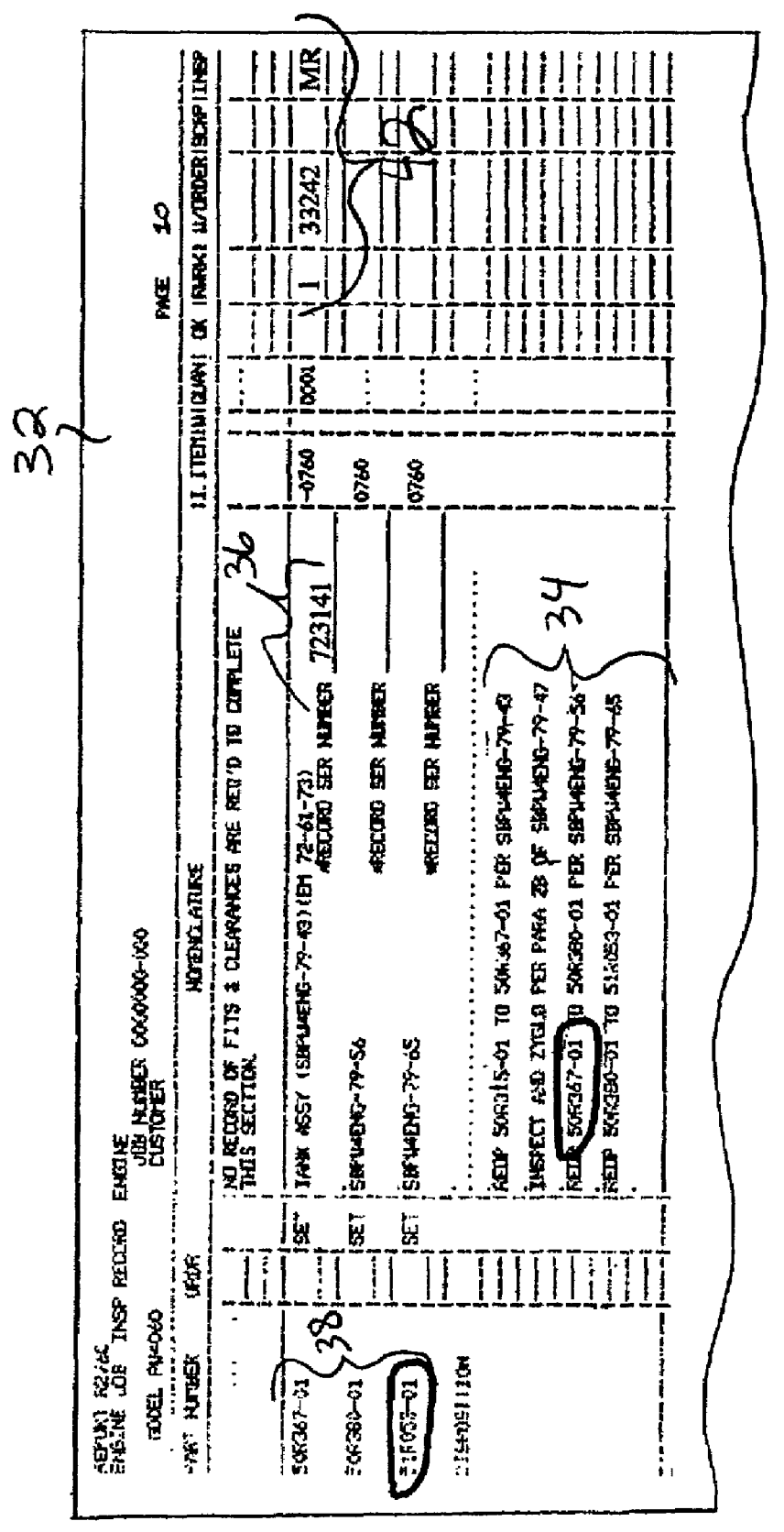

Generally speaking, the EIR includes an MPL (also called a Grand BOM) and a list of SBs that relate to each part number. Although the maintenance facility produces the EIR with a computer, the inspector enters data by hand on a hard copy printout of the EIR. FIG. 2 displays a portion of an EIR during the inspection portion of the overhaul process.

The EIR 32 lists all possible part numbers for each part in section 34. The inspector indicates on the EIR 32 which part was removed from the engine by circling the appropriate part number in section 34. If the part has a serial number, the inspector will enter the serial number of the part in section 36.

The inspector now performs any measurements or tests on the part to determine whether the part could be reinstalled on the engine. If the part needs rework, the inspector will generate a work order to perform the necessary work on the parts. The inspector could either manually create a work order, or enter the necessary information into a dedicated computer (not shown) to produce a work order electronically.

The EIR 32 also includes a section 34 that lists SBs and the relationship between the part numbers and the SB. Likewise, the EIR 32 includes another section 38 that provides a list of possible part numbers that could be reinstalled in the engine after the maintenance operation. The inspector indicates in section 38 which part number should be reinstalled on the engine after the maintenance operation.

To make such a determination, the inspector would need to consult the work scope of the maintenance operation produced in step 12. Specifically, the inspector would need to review the work scope for any of the SBs listed in section 34.

The inspector must now prepare the paperwork to have the necessary work instructions performed to convert the removed part to the part being reinstalled on the engine. For example, the inspector may need to generate paperwork to have SBs performed on the part removed from the engine.

The inspector must also remain cognizant of SBs that have Sets Requirements. To do so, the inspector would consult the SBs before generating the paperwork. In essence, the inspector reviews the SBs to determine whether an SB affects other parts in the engine. If a conflict does exist, the inspector may need to adjust the work order accordingly (or even not allow incorporation of the SB). Typically, this process involves numerous iterations.

After preparing the work order (which may be manually generated or with the assistance of a dedicated computer), the inspector manually enters work order information on another section 42 of the EIR 32.

The present invention represents a significant change from the aforementioned conventional inspection process. The present invention provides a tool to accomplish several tasks during the maintenance operation. Different than with conventional methods, the tool uses a computer system to assist actively with these tasks. FIGS. 3-7c will be used to describe features of the tool relevant to the present invention.

Figure 3:
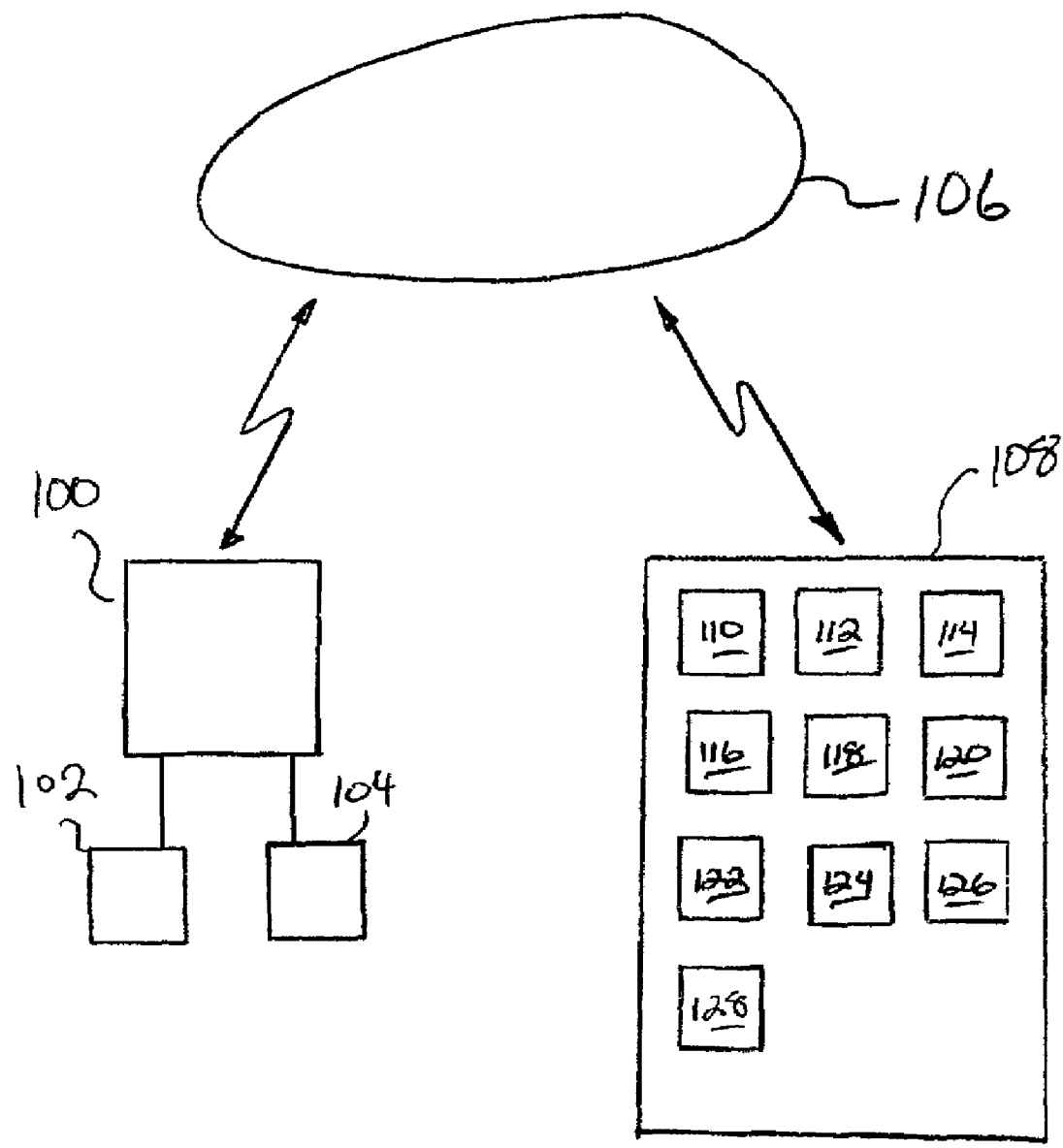
FIG. 3 is a schematic of a computer system capable of using the present invention.

FIG. 3 provides a schematic representation of such a computer system. Generally speaking, the computer system could include a general purpose computer 100. The computer 100 should have a suitable processor (not shown) to execute the program code, memory (not shown) to store data and the program code, one or more mass storage devices (not shown), one or more input devices 102 (e.g. mouse, keyboard or barcode scanner) and one or more output devices 104 (e.g. monitor or printer).

The computer 100 could connect to a network 106 using conventional connection technology (e.g. LAN, WAN, dial-up or wireless). Using the network 106, the computer 100 could access one or more remote resources, such as one or more servers 108.

The computer 100 should be capable of running a program locally. The program may be written in any suitable programming language, such as dynamic HTML or JAVA script. Preferably, the program provides one of the output devices 104 with a graphical user interface (GUI) to help the technician perform the aforementioned tasks.

The server 108 could include the same components as computer 100. However, the server 108 should have the capability to process and to store larger amounts of data than the computer 100. The server 108 preferably stores the databases needed by the program. Such databases include an MPL/Grand BOM database 110, an IPC database 112 and an SB database 114.

The server 108 also includes a database 116 containing a list of the SBs that the maintenance facility will perform during the maintenance operation ("modification scope database") and a database (not shown) containing a historical list of SBs previously performed on the engine during earlier maintenance visits ("historical SB database"). As discussed earlier, the maintenance facility determines the modification scope of the maintenance operation before the engine arrives at the maintenance facility. Another module (not shown) of the program helps the maintenance facility create the modification scope database 116.

The server 108 should also include an Expected BOM database 118. Again, the Expected BOM is a list of the parts that the maintenance facility should find in the engine during disassembly. If the maintenance facility performed the last maintenance on the engine, then the program could populate the Expected BOM database 118 with information from the As-Shipped BOM during the last maintenance visit.

The server 108 should also include a Planned Configuration database 120. Another module (not shown) of the program creates the Planned Configuration database 120 by passing the modification scope database 116 through the Expected BOM database 118. In other words, the Planned Configuration database 120 is a list of parts that should be reassembled into the engine upon performing the planned modifications.

The program has multiple modules to assist the technician at various stages of the maintenance operation. Several of these modules will be described in detail below.

Although the present invention is preferably suited for use by an inspector during the fourth step 18, the maintenance facility may allow a technician to use a teardown module 200 of the tool during the third step 16 of the maintenance operation process. Namely, the maintenance facility uses the teardown module 200 when disassembling the engine to part level.

Generally speaking, the teardown module 200 helps the technician populate an As-Received Configuration database 122. In other words, the technician advises the program of the actual parts removed from the engine during disassembly. This feature is particularly beneficial when the actual part was unexpected (i.e. not in the Expected BOM database 118). The present invention allows the maintenance facility to determine the impact of the unexpected part and to begin looking for a suitable replacement part.

Figure 4:
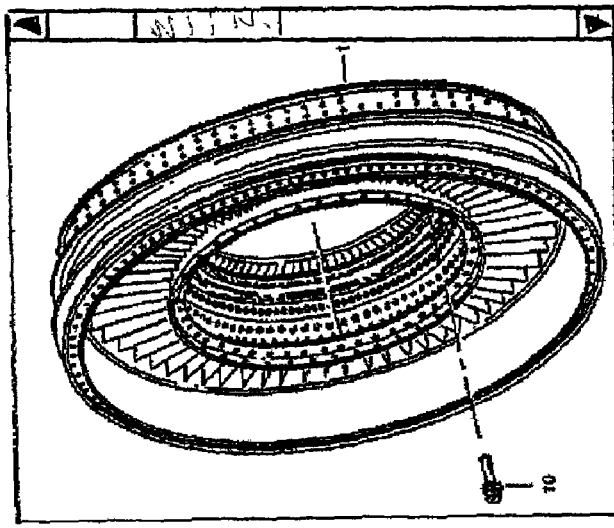
FIG. 4 is a screen generated on the computer system of FIG. 3 by a teardown module of the present invention.

FIG. 4 displays a screen 202 from the teardown module 200. The screen 202 includes a customer information section 204. The technician can manually enter the service order number (or any other suitable identifier) or choose the relevant service order number by opening the drop-down box. A service order database (not shown) populates the drop-down box with options.

The screen 202 also includes a filter section 206. The filter section 206 allows the technician to limit information provided in the screen 202. The filter section 206 could use any suitable filtering method. For example, the filter section 206 allows the technician to display information by operational section or another suitable format such as Air Transport Association Specification 100 format. The technician can manually enter the desired section by opening a drop-down box. The program can use the IPC database 112 to populate the drop down box.

Based upon the information provided in the customer section 204 and the filter section 206, the program queries the IPC database 112 to populate an illustration section 208 and a part information section 210. This allows the technician to visually compare the part removed from the engine with the IPC.

The part information section 210 could include information from various databases. In particular, the part information section 210 may include information from the MPL/Grand BOM database 110, the IPC database 112, the Expected BOM database 118 and the Planned Configuration database 120. Using a hierarchy format (e.g. indents) similar to that used in the operational section of the IPC, the part information section 210 displays relevant information from the MPL/Grand BOM database 110 (i.e. the selection appearing in filter section 206). In other words, the part information section 210 lists, for the selection displayed in filter section 206, all possible part numbers for the parts removed from the engine.

The part information section 210 could also indicate which part numbers also reside in the Expected BOM database 118 and the Planned Configuration database 120. FIG. 4 shows the use of printed indicia ("(Planned)38 and "(Expected)") to inform the technician. However, the program need not notify the technician with the planned or expected part information since the technician merely removes the parts from the engine and is not involved in configuration management.

The technician selects a selection box 212 adjacent to the actual part removed from the engine with a mouse 102. If the part is a serialized part, then the program will display a query window (not shown) asking the technician to input the serial number of the part. The program could also display a query window (not shown) asking for time and cycle information for the part. With the increased use of 2D bar-coding of engine parts, the technician could merely scan the part with a hand-held scanner 102. Note that 2D bar-coding can contain both part number information and serial number information.

After the technician selects the appropriate box 212, the program performs several operations. First, the program creates an electronic record (not shown) of the part. The electronic record preferably assigns a unique identifier to the part for tracking purposes. The electronic record could also include other relevant information. For example, the electronic record could include physical location information, routing information, work instructions, and status information. The program adds or modifies the electronic record as needed during the remainder of the maintenance operation. The electronic records for each part removed from the engine resides in a parts records database 124.

One benefit of the electronic part record is the ability for other areas of the maintenance facility to view the record or to use data from the record. Conventionally, such information was not available to other areas of the maintenance facility. The only way for an individual in the maintenance facility to obtain such information using conventional techniques was to locate the part within the maintenance facility and to read the associated paperwork.

Second, the program adds the part number to an As-Received Configuration database 122 on the server 108. This allows the program to determine whether any parts removed from the engine were "unexpected." That is, the part removed from the engine is not found in the Expected BOM.

Upon recognizing an unexpected part, the program must determine whether the modification scope of the maintenance operation must change. If a change to the modification scope is necessary, then the program notifies another area of the maintenance facility of the unexpected part with an alert (not shown). The alert also offers suggested changes to the modification scope that would allow the maintenance facility to reuse the unexpected part. The program performs this task in another module (not shown) of the program by searching the SB database 114 to establish whether the maintenance facility can perform one or more SBs on the unexpected part to produce the planned part. Likewise, the alert should notify the user if no suitable change exists (i.e. the unexpected part cannot be reused in the engine).

Based upon this information, the other area of the maintenance facility can modify the modification scope database 116 in another module (not shown) of the program in order to disposition the unexpected part properly. When changing the modification scope database 116, the program will also update the Planned Configuration database 120.

Third, the program determines the immediate disposition of the part. Specifically, the program determines whether or not the maintenance facility can reuse the part when reassembling the engine. The program can make this determination by querying the Planned Configuration database 120 and, if necessary, the SB database 114.

For example, the program could make this determination in multiple steps. In a first step, the program could initially determine if the part removed from the engine is in the Planned Configuration. If so, then the maintenance facility may reuse the part (assuming that later steps in the maintenance operation do not reveal damage, etc. that makes the part unusable). In a second step (for parts not in the Planned Configuration), the program will query the modification scope database 120 to determine if one or more SBs will reoperate the part removed from the engine to the Planned Configuration. The remaining parts will not be reused when assembling the engine. The program adds this disposition to the electronic part record in any suitable manner.

Fourth, the program generates a tag 300 for affixing to part. The program automatically generates the tag 300 with the printer 104. The technician attaches the tag 300 to the part in any known manner. Preferably, the tag 300 is the only paper generated by the program. The program preferably keeps only electronic records. If the part uses the aforementioned 2D bar-coding, then the program need not create the tag and the part would travel without any tag. The technician could merely scan the part to determine any needed information by the program accessing the electronic part record.

The tag 300 includes information found in the electronic part record. Specifically, the tag 300 includes a part information section 302, a customer information section 304, a status section 306, a bar code section 308 and a routing information section 310. The tag 300 could, however, have more or less information thereon as needed by the various locations within the maintenance facility.

The program creates information for the status section 306 based upon the disposition of the part determined by the program above. The status section 306 could display any suitable message. Suitable messages include "Remove from Service" (e.g. to indicate that the maintenance facility will not reuse the part) or "Created" (e.g. to indicate that the maintenance facility may reuse the part, assuming subsequent procedures or testing of the part confirm this decision).

The bar code section 308 preferably corresponds to the unique identifier assigned by the program in the electronic part record. Other identification schemes could be used.

The routing information section 310 describes the flow of the part through the maintenance facility in order to disposition the part properly. For example, the routing information section 310 lists the specific areas within the maintenance facility that should receive the part. The program determines the data for the routing information section 310 based upon the status section 306 and other databases such as the EM or the Standard Practices Manual (SPM).

To establish the proper part routing, the program must first determine what operations and/or testing the part must undergo. In other words, the program must assemble a work instruction database 126. The program assembles the work instruction database 126 from relevant databases (e.g. the EM or the SPM). Since these relevant databases assign unique numbers to the various tasks described therein (e.g. task 72-33-01-990-001), the work instruction database 126 could merely be a listing of task numbers.

Figure 5:
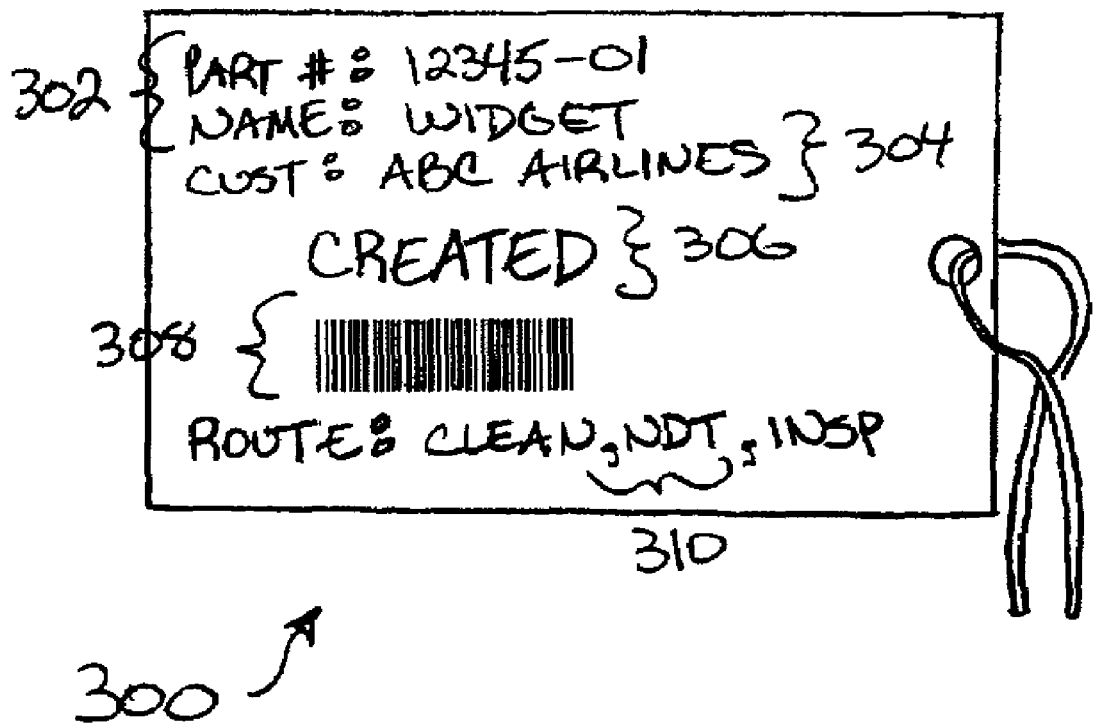
FIG. 5 is a tag created by the teardown module of the present invention.

Based upon the locations within the maintenance facility that will perform the work instructions, the program determines the proper part routing to perform these tasks. FIG. 5 displays a typical routing information section 310. Upon querying the aforementioned databases, the program determined that the part must undergo various procedures. Specifically, the figure displays that the part must undergo a cleaning step and a non-destructive testing step before the part travels to an inspector for a final determination of disposition. The technician will route that part (with the tag 300 attached) based upon the information provided on the tag 300.

When the part arrives at the proper location within the maintenance facility, a technician will scan the part with the bar-code reader 102. The reader 102 scans the bar code section 308 of the tag. The program then accesses the electronic part record within the parts records database 124 since the bar code corresponds to the unique identifier assigned to the electronic part record.

The program will then generate a screen (not shown) that displays information relating to the relevant tasks from the work instructions database 126. Notably, the program will only display tasks specific to the area of the maintenance facility that possesses the part. For example, when a technician from a cleaning area of the maintenance facility scans the tag 300, the program filters the work instruction database 126 to display only tasks relevant to cleaning the part.

The screen should provide the technician with the actual work instructions. The program provides such information by displaying the relevant sections of the EM, SPM and/or the IPC.

The present invention has clear benefits over conventional techniques. The first benefit is the reduction in paper. Conventionally, the maintenance facility shipped additional paperwork (e.g. work instructions) with the part. The present invention (aside from the tag 300) is paperless. The process can be paperless because the program will obtain the necessary information from one or more of the databases on the server 108 and will display such information as needed.

The second benefit is the reduction in unnecessary work performed on the parts. Conventionally, the maintenance facility never changed the preliminary disposition of the part. The preliminary disposition never changed despite discoveries during the subsequent removal of other parts that would have affected the earlier disposition determination.

Take for example a subsequently removed unexpected part. The maintenance facility may determine that a change to the modification scope of the overhaul is necessary to include an SB that reuses the unexpected part. The SB may also affect an earlier removed part. The SB could, for example, replace the earlier removed part with another part. Since the maintenance facility will not reuse the part in the engine, the maintenance facility may not need to perform as many, if any, tasks on the part. Conventionally, the part would undergo these unnecessary tasks. Only when the part arrived at the inspector section of the maintenance facility would a realization occur that the original disposition is no longer proper.

The present invention prevents the performance of such unnecessary tasks. When altering the modification scope database 116, the program could flag the previously dispositioned parts affected by the change to the modification scope database 116. When the technician scans the part to perform an internal repair (or an external repair should the vendor have access to the computer system 100), the program would recognize the flag, alert the user and print out a new tag 300 to reflect the newly revised disposition of the part.

The technician notifies the program upon completion of the work instructions. program then modifies the work instructions database 126 to indicate completion of the specific tasks. The technician then routes the part to the next location designated in the routing information section 310 of the tag. The program could generate an updated tag 300 for the technician to affix to the part as a replacement to the earlier tag 300.

Eventually, the tag 300 routes the part to an inspection area of the maintenance facility. The inspection area makes the final determination of part disposition. Although capable of use by a technician during teardown, the preferred user of the present invention is an inspector. The inspector examines the parts previously removed from the engine by the technician.

FIGS. 6*a-d* display various shots of one embodiment of a screen 402 from the inspection module 400. The screen 402 includes a customer information section 404, a part information section 406 and various tabs 408,410,412,414. The inspector could populate the customer and part information sections 404,406 manually. If the maintenance facility uses the teardown module 200, the program can automatically populate the customer information section 404 and part information section 406 when the inspector scans the tag 300 created by the technician.

In other words, the technician advises the program of the actual parts removed from the engine during disassembly. The inspector inputs the information in the same manner as described above with respect to the technician using the teardown module 200. If the part is serialized, the program could generate a window (not shown) requesting additional information from the inspector. For example with life limited parts, the program could seek information regarding the number of hours and cycles since the last measurement. The system 100 preferably keeps the old measurements in a database on the server 108. The program will update the database with the new information.

The various tabs 408-414 display the options that the program makes available to the inspector. In the technical information tab 408, the inspector can access particular information from relevant publications by choosing the desired publication and selecting the view button. The program then searches the chosen database for relevant information, displaying the relevant area of the publication in another window (not shown). For example, should the inspector choose to view the EM, the program would display portions of the EM specific to the part input into the part information section 406 and relevant to an inspector (such as visual inspection requirements for the part).

Once obtaining the necessary information from the technical information tab 408 and performing the necessary tasks described therein, the inspector can proceed to the configuration tab 410. The configuration tab 410 allows the inspector to populate the Should Build Configuration database 128 (if the maintenance facility does not utilize the teardown module 200). The As-Received part information previously supplied to the part information section 406 helps the inspector determine the Should Build Configuration.

Since a part may be used in more than one location within the engine, the program assigns a location identifier (LID) to each location in the engine. The LID could use any format. Preferably, the LID has five fields. The first three fields of the LID preferably correspond to ATA Chapter (e.g. 72), Section (e.g. 52) and Subject (e.g. 00). The fourth field preferably corresponds to the IPC Figure that displays the part. The fifth field preferably corresponds to the Item Number in the IPC Figure assigned to the part. The specific LID appears in a LID section 416. If a part number appears within multiple LIDs, the program allows the inspector to the select the specific LID after populating the part information section 406.

Figure 6A:
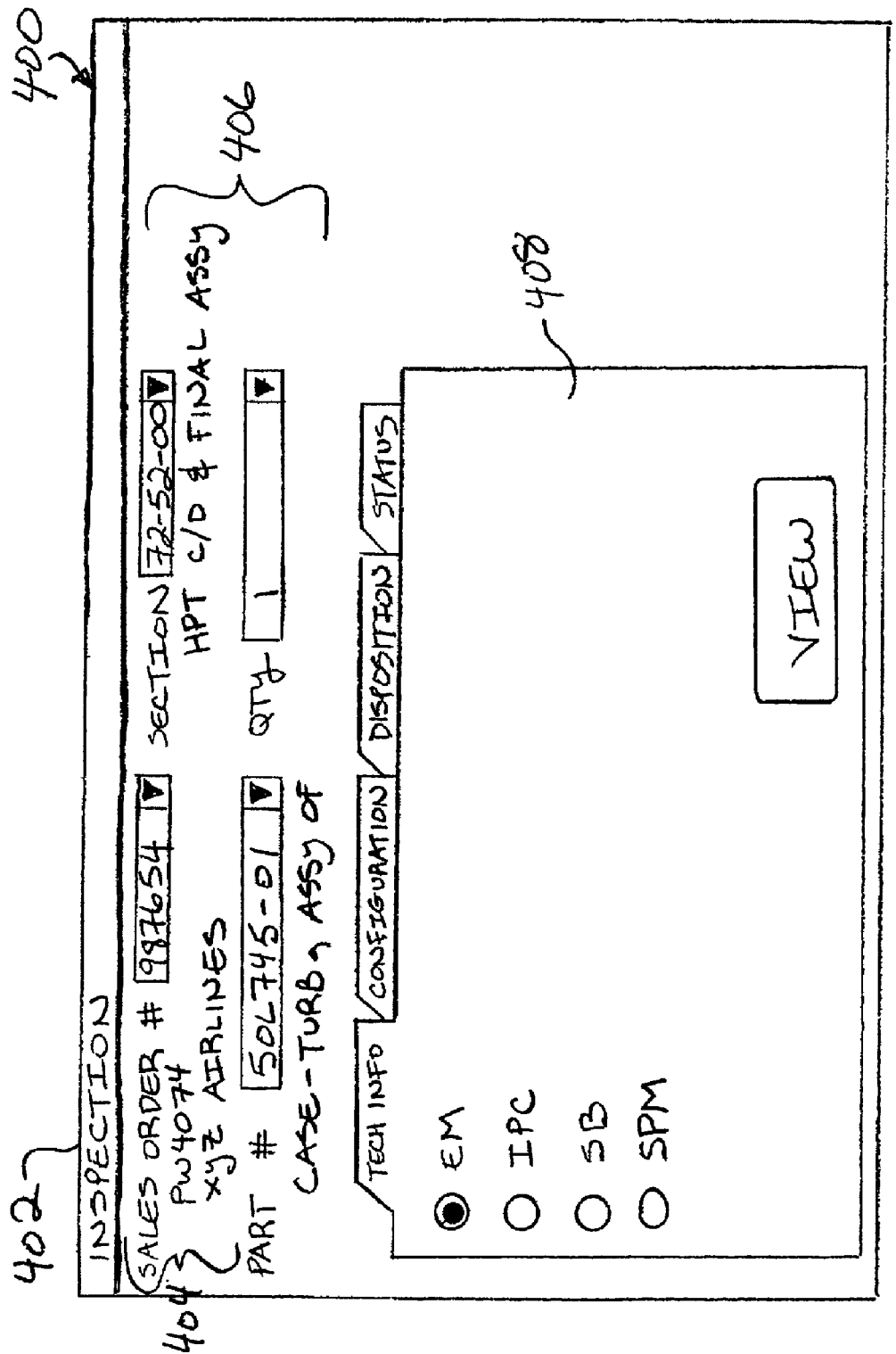
Figure 6B:
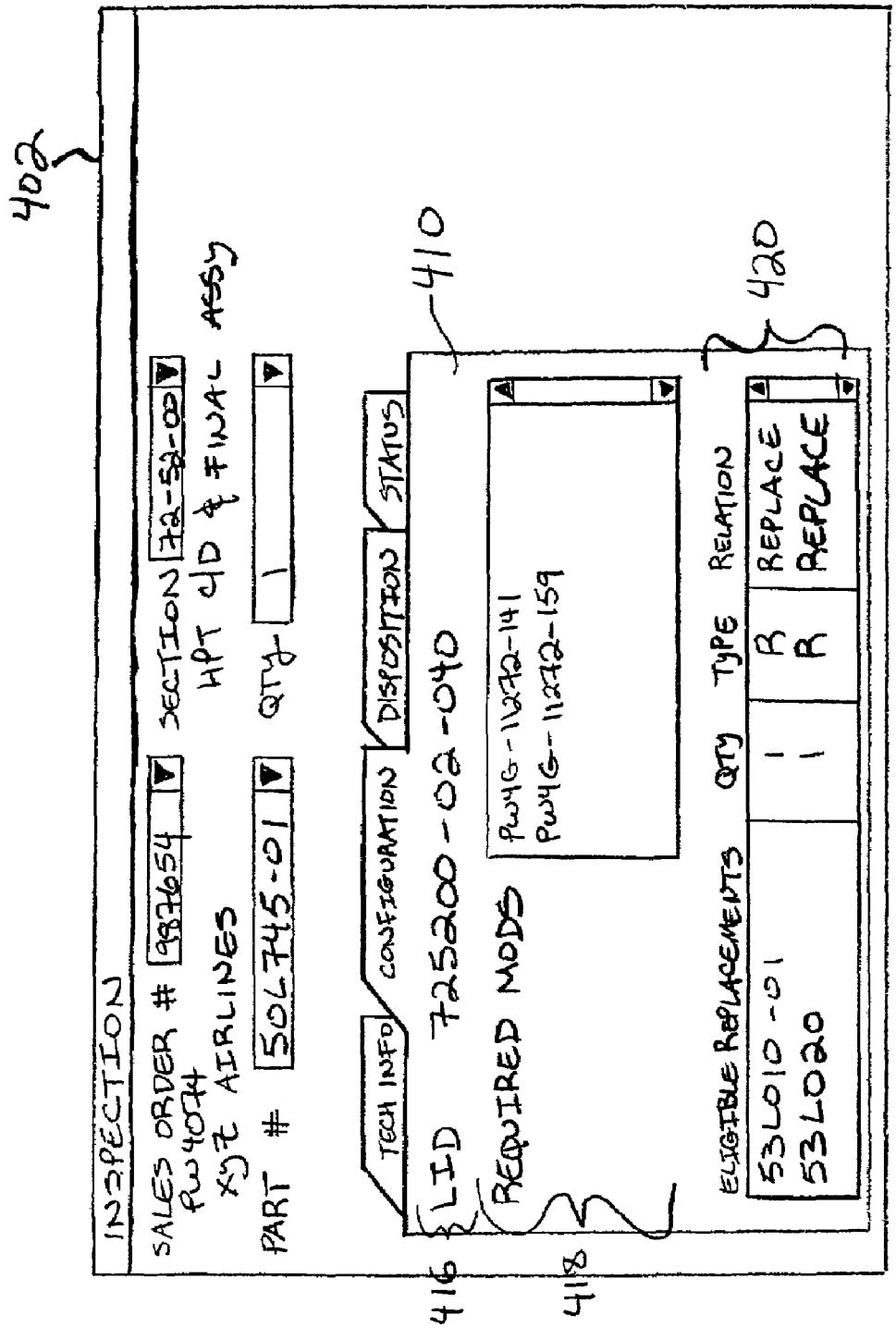
Figure 6D:
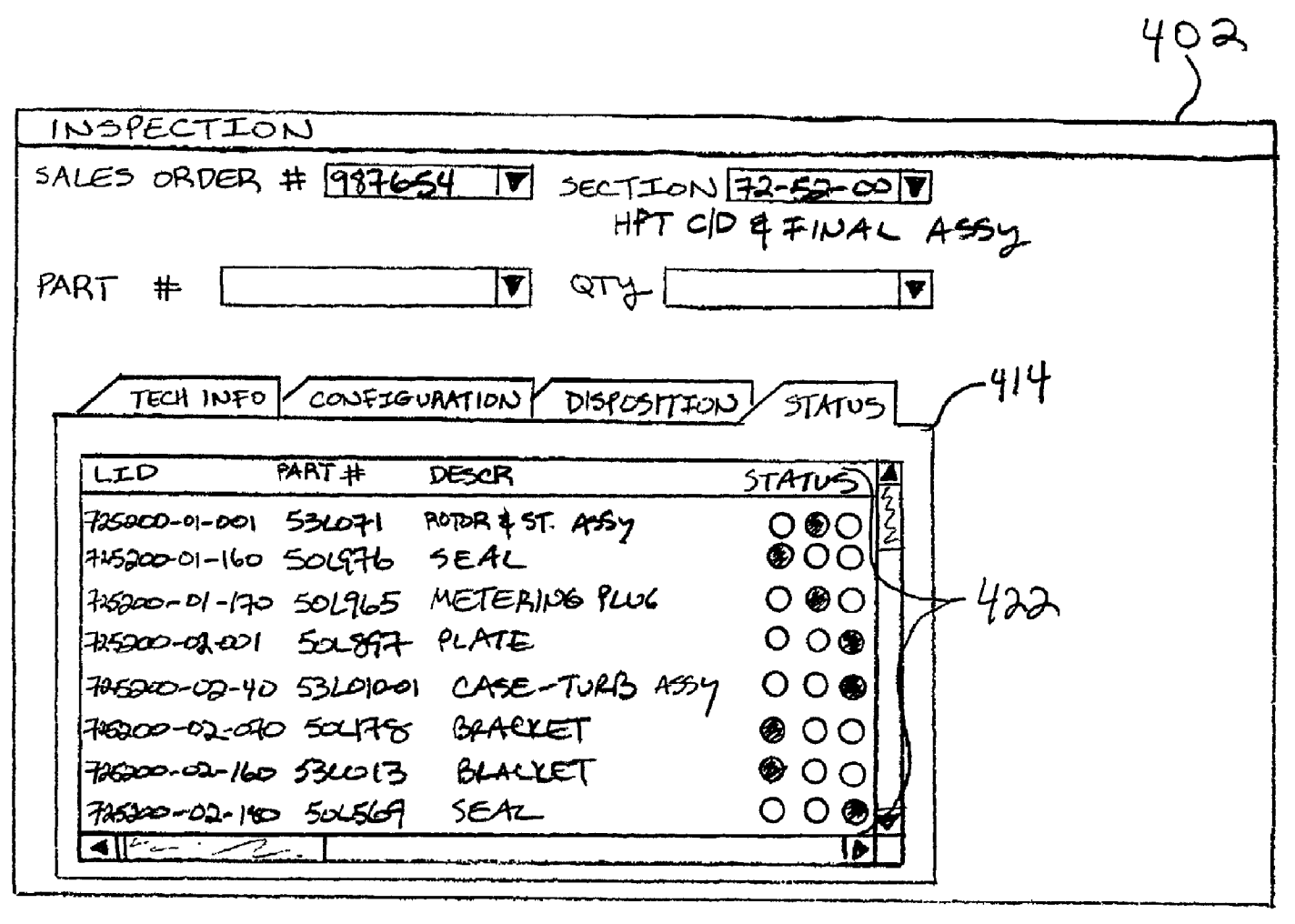

After obtaining the received part number and LID, the program then informs the inspector of the modifications relevant to the part. The configuration tab 410 displays this information in a modification information section 418. The modification information section 418 displays the SBs relevant to the part listed in the part information section 406. The program obtains this information by searching the modification scope database 116 and the historical SB database for instances of SBs that affect the part at that LID. As seen in FIG. 6*b*, two SBs from these databases have effectivity to the part at the LID.

The program will then inform the inspector of the parts eligible to replace the part removed from the engine. The configuration tab 410 displays this information in an eligible replacement part section 420. The program obtains this information using a two step process. First, the program determines all potential replacement parts for the removed part at the LID by iterating through the SBs listed in the modification information section 414.

Second, the program removes from such list any potential replacement parts that are excluded due to an earlier decision of the inspector. For example, if a part chosen by the inspector for reinstallation on the engine requires the incorporation of an SB with a Sets Requirement affecting the current part, the program will remove from consideration any potential parts that violate the Sets Requirement. The program displays all valid potential replacement parts in the eligible replacement part section 420.

The eligible replacement part section 420 also describes the relationship between the removed part and each eligible replacement part through the incorporation of the SBs. The program obtains this information by querying the MPL database 110. For example, the eligible replacement part section 420 displays that the two SBs replace (rather than reoperate) the removed part with the planned part. The inspector selects the desired eligible replacement in the replacement part section 420 by double clicking the part number with the mouse 102. The program then proceeds to the disposition tab 412.

The disposition tab 412 allows the inspector to generate the electronic paperwork necessary to perform necessary work (i.e. SBs) on the part. As stated above, preferably the present invention does not generate hard copy paperwork (aside from the tag 300).

The disposition tab 412 displays the options available to the inspector. The program can tailor the options to the specific maintenance facility. In FIG. 6*c*, the program allows the inspector to: (i) identify parts as serviceable; (ii) remove parts from service; (iii) allow part repair by an internal source; (iv) allow part repair by an external vendor. The program will perform certain tasks in response to the choice selected by the inspector.

The first choice available to the inspector in the disposition tab 412 is to identify the parts as serviceable. The maintenance facility can reinstall a serviceable part on the engine in its current condition. In other words, the part meets the inspection requirements in the relevant technical publications and the modification workscope does not affect the part. The serviceable part can travel directly to the kitting area of the maintenance facility to await reassembly into the engine.

Figure 7A:
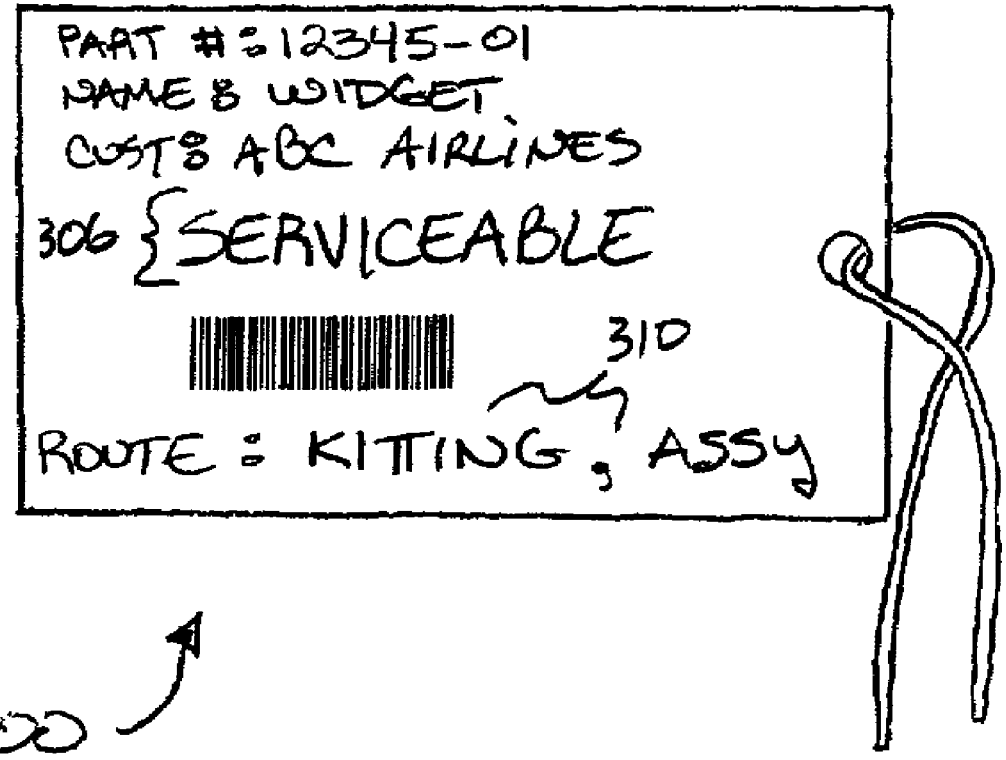
FIGS. 7a-c are various tags created by the inspection module of the present invention.

The program facilitates the routing of the part by generating a new tag 300 (or, if the maintenance facility uses the teardown module 200, by generating a replacement tag 300 for the previously created tag 300). FIG. 7A displays the tag 300. The tag 300 could include similar information described above with the tag 300 created by the teardown module 200. Specifically, the tag could include a routing information section 310 to reflect the disposition selected by the inspector. In addition to the status section 306, the tag 300 could include other indicia to display part status. For example, the tag 300 could have a distinctive color such as green. The program also updates the electronic part record accordingly.

Figure 7B:
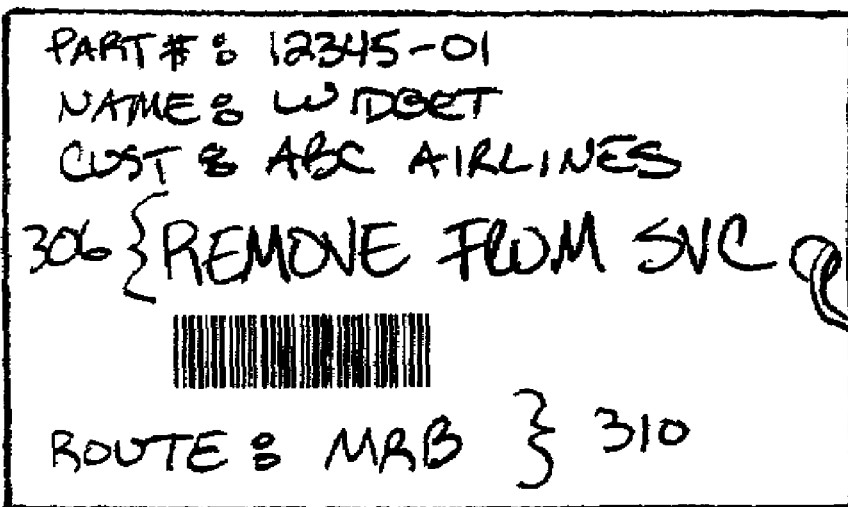

The second choice available to the inspector in the disposition tab 412 is to remove the part from service. This means the maintenance facility will not reinstall the part on the engine. Similar to a serviceable part, the program facilitates this routing by generating a new tag 300 (or, if the maintenance facility uses the teardown module 200, by generating a replacement tag 300). FIG. 7B displays the tag 300. Specifically, the tag 300 could include a routing information section 310 to reflect the disposition selected by the inspector. In addition to the status section 306, the tag 300 could include other indicia to display part status. For example, the tag 300 could have a distinctive color such as brown. The program also updates the electronic part record accordingly.

The part preferably should then travel to a review section at the maintenance facility to determine if the part could be reused in another engine or the maintenance facility must scrap the part (i.e. no engine can use the engine). If the part will be scrapped, the program can generate a new tag (not shown) with a distinctive color such as red.

Since the maintenance facility will not reuse the part, the maintenance facility must obtain a part for installation on the engine. To assist this process, the program will alert the proper location within the maintenance facility (e.g. purchasing) of the need for a part. The location will obtain the needed part using conventional techniques.

The third and fourth choices available to the inspector in the disposition tab 412 are to allow internal and external part repairs, respectively. This means that the part must undergo repairs before the maintenance facility can reinstall the part on the engine. A repair includes work instructions to fix wear or damage to the part, or to incorporate one or more SBs.

Figure 7C:

To perform these repairs, the part can either remain within the maintenance facility or travel to an external vendor. Similar to serviceable parts and parts removed from service, the program facilitates this routing of the part by generating a new tag 300 (or, if the maintenance facility uses the teardown module 200, by generating a replacement tag 300). FIG. 7C displays the tag 300. Specifically, the tag 300 could include a routing information section 310 to reflect the disposition selected by the inspector. In addition to the status section 306, the tag 300 could include other indicia to display part status. For example, the tag 300 could have a distinctive color such as yellow. The program also updates the electronic part record accordingly.

The program should also assemble the work instructions necessary to complete the repair. Preferably, the program places these instructions in the work instructions database 126 on the server 108. This allows the program to display the work instructions to the repair technician upon scanning the tag 300. As described above, the program performs this feature by searching the work instructions database 126 for tasks relevant to the subject part.

If the repair source does not have access to the program, the program should have the ability to print a hard copy of the work instructions for sending along with the part.

When the repair source notifies the program of repair completion, the program updates the work instructions database 126 and generates a new tag (not shown) to return the part to the appropriate location (e.g. kitting or an inspector for external repairs) within the maintenance facility.

The fifth option available to the inspector is to hold the part temporarily. This option suspends further disposition of the specific part. The inspector may now disposition other parts. The inspector can return at a later time to disposition the part by scanning the tag 300.

While dispositioning the parts in the inspection module 400, the inspector can visit the status tab 414. The status tab 414 displays information relevant to the parts appearing in the Should Build Configuration database 128. Next to the part information, the status tab 414 includes a status indicator 422. The status indicator 422 could have any suitable arrangement, including the "stop light" arrangement shown in FIG. 6d.

The status indicator 422 adjacent the part number will stay red until the inspector dispositions the entire quantity of the given part number. Once disposition of the entire quantity has occurred, the status indicator 422 adjacent to the part number should turn yellow. After the repairs to the entire quantity of the given part number have occurred and the entire quantity of parts are available for reassembly into the engine (e.g. the parts arrive in kitting), the status indicator 422 should turn green.

Once the inspector has populated the As-Received Configuration database 122 and has dispositioned every part removed from the engine, the program performs several final tasks. First, the program will verify the validity of the parts chosen by the inspector for reinstallation into the engine. The program determines the validity by progressing the As-Received Configuration database 122 through the modification scope database 116. The program then confirms that the selections made by the inspector during the disposition process appear in the universe of valid configurations. The program notifies the inspector with a warning screen (not shown) if any discrepancies exist.

Note that the program could perform this first task again at a later stage of the maintenance operation. For example, the program could perform the validation when all parts arrive at kitting.

Second, the program will then generate a Should Build database 128. The presence of the Should Build database 128 is beneficial to other areas of the maintenance facility. For example, other areas of the maintenance facility can review the Should Build database 128 for any logistical problems (e.g. part unavailability or high part price). Another module (not shown) of the program can assist the maintenance facility make any adjustments to the modification scope to avoid such logistical problems.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A method for maintaining an aircraft engine, comprising:
    inputting a modification scope of at least one maintenance operation for at least one part of an aircraft engine;
    generating an expected bill of material comprising said at least one part for said aircraft engine;
    tearing down said aircraft engine;
    populating an as-received configuration database with at least one part for said aircraft engine;
    finding an unexpected part in said aircraft engine;
    determining whether to reconfigure said modification scope of said at least one maintenance operation for said aircraft engine based upon finding said unexpected part;
    dispositioning said unexpected part;
    modifying said as-received configuration database for said aircraft engine based upon the disposition of said unexpected part;
    generating for said unexpected part a tag comprising at least a part status;
    routing said unexpected part based upon said part status;
    generating a should-build database for said aircraft engine based upon the disposition of said unexpected part;
    reassembling said aircraft engine; and
    generating an as-shipped bill of material comprising said at least one part for a reassembled aircraft engine based upon at least the disposition of said unexpected part.

2. The method of claim 1, wherein finding comprises finding a part not listed on said expected bill of material for said aircraft engine.

3. The method of claim 1, wherein dispositioning comprises the steps of:
    determining whether said unexpected part is a planned part of said aircraft engine; and
    determining said unexpected part is said planned part.

4. The method of claim 3, further comprising generating for said unexpected part a new tag that indicates said unexpected part is said planned part.

5. The method of claim 1, wherein dispositioning comprises the steps of:

determining whether said unexpected part is a planned part of said aircraft engine;
determining said unexpected part is not said planned part;
determining whether said unexpected part is reoperable to produce said planned part; and
reoperating said unexpected part to produce said planned part.

6. The method of claim 5, further comprising generating for said planned part a new tag that indicates said planned part comprises a reoperated unexpected part.

7. The method of claim 5, wherein reoperating comprises performing an internal repair, an external repair or both said internal repair and said external repair upon said unexpected part.

8. The method of claim 1, wherein dispositioning comprises the steps of:
determining whether said unexpected part is a planned part of said aircraft engine;
determining said unexpected part is not said planned part;
determining said unexpected part is not reoperable to produce said planned part; and
removing said unexpected part from said as-received configuration database.

9. The method of claim 8, further comprising generating for said unexpected part a new tag that indicates said unexpected part has been removed.

10. The method of claim 1, wherein routing comprises the steps of:
generating at least one work instruction for said unexpected part;
determining at least one location where said at least one work instruction is performed; and
routing said unexpected part to said at least one location.

11. The method of claim 10, further comprising generating for said unexpected part a new tag that indicates at least one routing instruction for said unexpected part.

12. The method of claim 1, wherein dispositioning comprises the steps of:
determining whether said unexpected part is a planned part of said aircraft engine;
determining said unexpected part is not said planned part;
comparing said unexpected part with at least one replacement part of said aircraft engine;
matching said unexpected part with said at least one replacement part; and
replacing said unexpected part with said replacement part.

13. The method of claim 12, further comprising generating for said replacement part a new tag that indicates said replacement part replaced said unexpected part.

14. The method of claim 12, wherein comparing comprises comparing a first location identifier of said unexpected part to a second location identifier of said at least one replacement part using at least one service bulletin of said aircraft engine.

15. A system for maintaining an aircraft engine, comprising:
means for inputting in a computer readable storage device a modification scope of at least one maintenance operation for at least one part of an aircraft engine;
means for generating in said computer readable storage device an expected bill of material comprising said at least one part for said aircraft engine;
means for populating in said computer readable storage device an as-received configuration database with at least one part for said aircraft engine;
means for determining whether to reconfigure said modification scope of said at least one maintenance operation for said aircraft engine based upon an unexpected part;
means for dispositioning in said computer readable storage device said unexpected part;
means for modifying in said computer readable storage device said as-received configuration database for said aircraft engine based upon the disposition of said unexpected part;
means for generating in said computer readable storage device a tag comprising at least a part status of said unexpected part;
means for routing said unexpected part based upon said part status;
means for generating in said computer readable storage device a should-build database for said aircraft engine based upon the disposition of said unexpected part; and
means for generating in said computer readable storage medium an as-shipped bill of material comprising said at least one part for a reassembled aircraft engine based upon at least the disposition of said unexpected part.

16. The system of claim 15, wherein means for dispositioning comprises:
means for determining whether said unexpected part is a planned part of said aircraft engine; and
means for determining said unexpected part is said planned part.

17. The system of claim 16, further comprising means for generating for said unexpected part a new tag that indicates said unexpected part is said planned part.

18. The system of claim 15, wherein means for dispositioning comprises:
means for determining whether said unexpected part is a planned part of said engine;
means for determining said unexpected part is not said planned part;
means for determining whether said unexpected part is reoperable to produce said planned part; and
means for reoperating said unexpected part to produce said planned part.

19. The system of claim 18, further comprising means for generating for said planned part a new tag that indicates said planned part comprises a reoperated unexpected part.

20. The system of claim 15, wherein dispositioning comprises:
means for determining whether said unexpected part is a planned part of said engine;
means for determining said unexpected part is not said planned part;
means for determining said unexpected part is not reoperable to produce said planned part; and
means for removing said unexpected part from said as-recieved configuration database.

21. The system of claim 20, further comprising means for generating for said unexpected part a new tag that indicates said unexpected part has been removed.

22. The system of claim 15, wherein means for routing comprises:
means for generating at least one work instruction for said unexpected part;
means for determining at least one location where said at least one work instruction is performed; and
means for routing said unexpected part to said at least one location.

23. The system of claim 22, further comprising means for generating for said unexpected part a new tag that indicates at least one routing instruction for said unexpected part.

24. The system of claim 15, wherein means for dispositioning comprises:
   means for determining whether said unexpected part is a planned part of said engine;
   means for determining said unexpected part is not said planned part;
   means for comparing said unexpected part with at least one replacement part of said engine;
   means for matching said unexpected part with said at least one replacement part; and
   means for replacing said unexpected part with said replacement part.

25. The system of claim 24, further comprising means for generating for said replacement part a new tag that indicates said replacement part replaced said unexpected part.

26. The system of claim 24, wherein means for comparing comprises means for comparing a first location identifier of said unexpected part to a second location identifier of said at least one replacement part using at least one service bulletin of said engine.

* * * * *